United States Patent Office 3,344,723
Patented Oct. 3, 1967

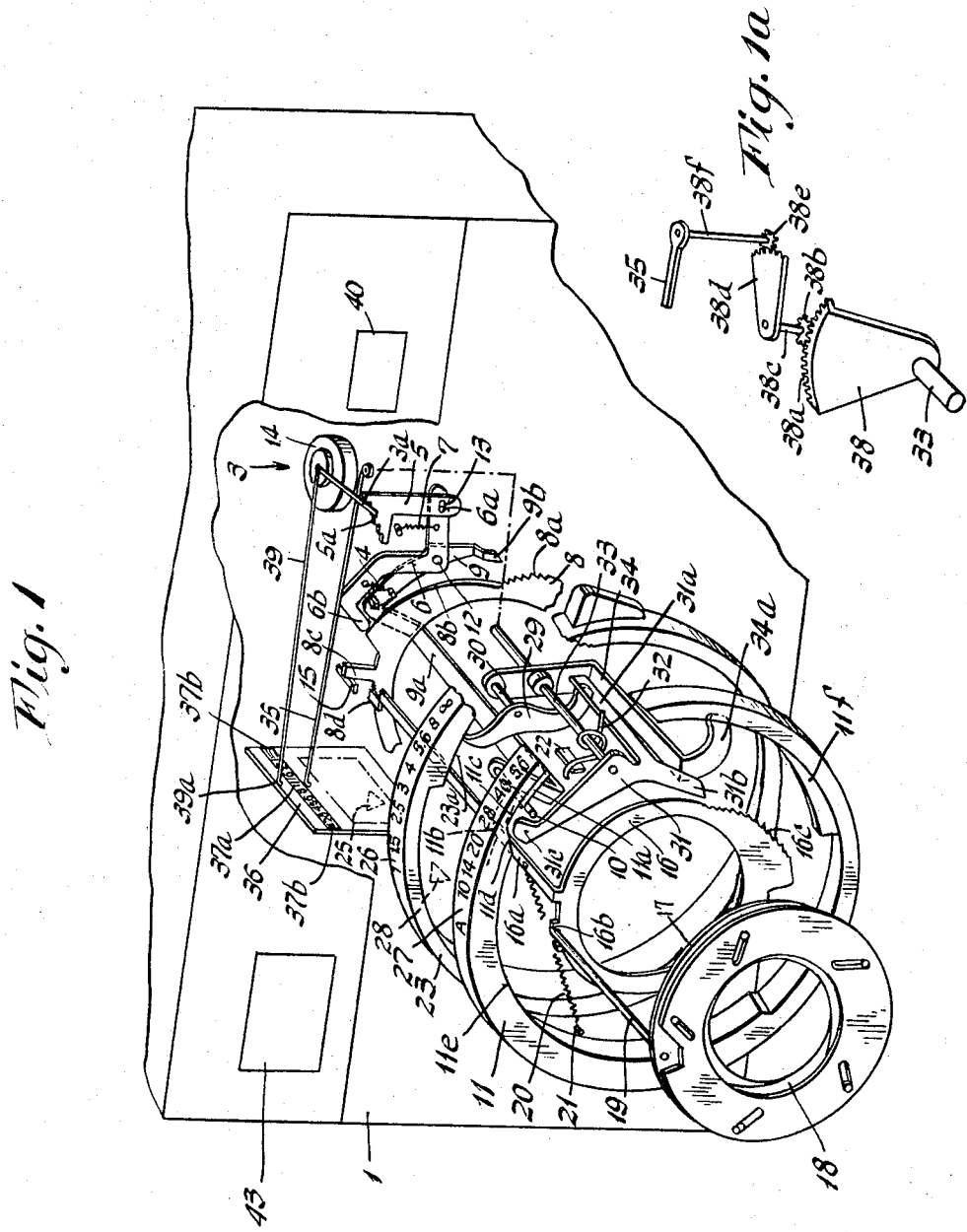

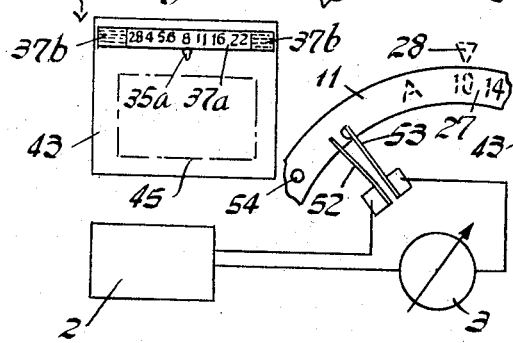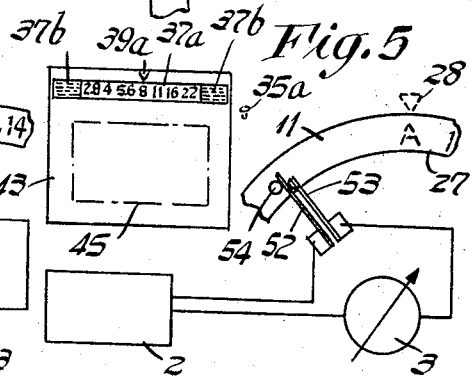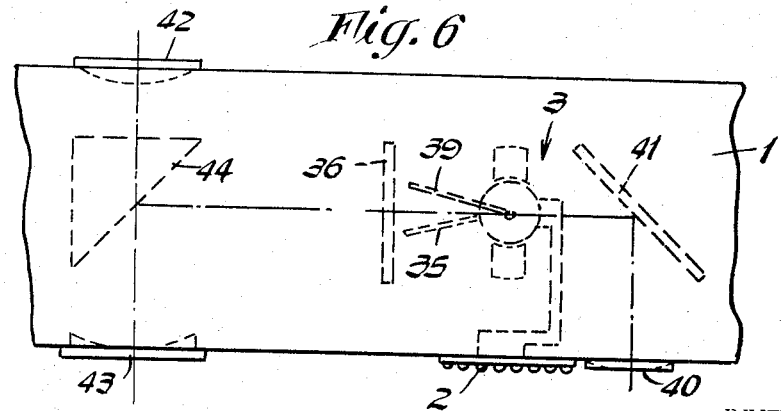

3,344,723
PHOTOGRAPHIC CAMERA WITH AUTOMATIC MEANS FOR SETTING THE DIAPHRAGM IN MAKING PHOTOFLASH EXPOSURES
Waldemar T. Rentschler, Calmbach (Enz), Germany, assignor to Alfred Gauthier, G.m.b.H., Calmbach (Enz), Germany, a corporation of Germany
Filed July 13, 1964, Ser. No. 382,286
Claims priority, application Germany, July 13, 1963, G 38,183
10 Claims. (Cl. 95—10)

ABSTRACT OF THE DISCLOSURE

A photographic camera having a variable diaphragm and a diaphragm setting member connected to control the diaphragm. A differential mechanism is provided on the camera which is connected to control the diaphragm setting member. Further, a distance control is provided which is connected to the differential mechanism to exert partial control thereof. The differential mechanism desirably comprises a rotatable output shaft operably connected to the diaphragm setting member. A guide number setting control is also provided on the camera and is connected to the differential mechanism to exert partial control thereof. In addition, an indicating device is provided comprising a field having a diaphragm aperture scale and a needle to indicate the selected portions of the scale. A connection is provided from the shaft to the needle to control the latter to indicate on the scale the diaphragm setting determined by the combined settings of both of the controls.

---

This invention relates to a photographic camera having a diaphragm which may be automatically set in making photoflash exposures and in which the setting is determined by the guide number of the flashbulb being used and by the distance from the object to be photographed in accordance with the guide number equation: guide number=diaphragm value×distance value. In particular, the invention relates to a photographic camera having two setting members operatively connected to the diaphragm setting member; for example, by means of a differential mechanism whereby the parameters in the equation may be imparted to the camera.

In cameras having automatic control of the diaphragm for photoflash exposures, there may occur occasions when the proper diaphragm value is either greater or smaller than the limits to which the diaphragm may be set. This situation can be remedied either by a change in the distance or in the flashbulb, provided another flashbulb of a higher or lower guide number, as required, is available.

In order to avoid faulty photoflash exposures, a locking device may be installed in the camera which permits the distance to be set only within the range that is permissible in accordance with the guide number equation. However, the installation of such a locking device requires a rather complicated and expensive mechanism which is not wholly reliable. This is especially true in those cameras which have other mechanisms for providing special automatic control in addition to the automatic control during photoflash exposures and in which the locking mechanism must be disconnected to permit operation in the other modes. It may happen that the locking device does not become fully operative or does not become operative at all, depending on the setting position that happens to be occupied by the distance setting member when a change is made from one of the functional ranges to the functional range corresponding to automatic photoflash exposures. In order to avoid improper operation the photographer must make sure that the distance setting member is within the setting range corresponding to the guide number equation before the camera is switched to the automatic photoflash exposure range. This requirement not only causes additional operational effort but is a source of irritation to photographers who are not familiar with the operation of the camera.

It is a principal object of the present invention to overcome the foregoing disadvantages and to provide a camera capable of automatic photoflash exposures and including a reliable safeguard against exceeding the permissible range in making a photoflash exposure, the camera being arranged so that no extra effort is required from the photographer and there is little additional cost.

In accordance with the invention, an indicating device having a field adjusted to the setting range of the diaphragm is provided along with a needle that cooperates with the field and is operatively connected to the setting members that actuate the diaphragm. This permits the camera to be equipped with a simple device that shows the photographer in a clear and dependable manner whether the presetting of the guide number value and the distance value will permit a correctly exposed photograph to be made or will produce an improperly exposed photograph. Prior to making an exposure, all that the photographer has to do is to make sure that the needle of the indicating device is within the proper field. If so, the photographer may expect a correct setting of the diaphragm. If, according to a different embodiment, the indicating field is provided with a diaphragm scale, the photographer may see the particular diaphragm value to be expected when the exposure is made and he may determine the depth of field available. In order to supply the photographer with a clear indication, it is further proposed that two warning fields, perhaps of different colors, be placed alongside the proper indicating field.

An inexpensive embodiment of the invention is obtained by connecting the needle of the indicating device directly to the element that initially determines the setting of the diaphragm control and the operation of the differential mechanism that coordinates the guide number and distance factors.

In cameras having exposure meters operatively connected and in which there are two functional ranges, one for taking photographs under automatic control of an exposure meter in daylight and the other for taking photographs under automatic control using photoflash apparatus, it is desirable, in order to obtain equally reliable and convenient operation in either range, to provide an additional indicating device so that there will be two indicating devices, one for automatic photoflash photographs and the other for automatic daylight photographs, the latter indicating device comprising an indicating field coinciding with the diaphragm range and cooperating with a needle coupled to the exposure meter.

One simple embodiment of the invention provides the two indicating devices but only a single indicating scale to indicate the exposure conditions for both the automatic photoflash range and the automatic daylight range.

In order to eliminate the possibility of a mistake, one indicating device for the other, the invention comprises means governed by one of the controls which allows only one of the two needles to be visible in conjunction with the indicating scale at any one time.

As a further convenience, a covering mask may be arranged to be actuated by the control that sets the camera for operation in either the automatic daylight range or the automatic photoflash range to remove from view the indicating needle that is not associated with the particular range for which the control is set.

Another embodiment that allows for only one needle to be visible on the indicating scale at any one time provides means whereby the needle controlled by the exposure meter can be moved to an end position outside of the indicating scale when the camera is set to the automatic photoflash range. Such means includes a breaker switch on the circuit of the exposure meter. At the same time, the other needle is moved away from the indicating scale by means of a cam on the appropriate control when the camera is switched over for automatic daylight operation.

Yet another feature of the invention is to be found in an embodiment of an indicating device in which the indicating scale is arranged to be viewed through the viewfinder or is reflected into the light path through the viewfinder. This permits the photographer to observe during the focusing process whether or not the diaphragm value that has been set is still in accord with the distance and is within the permissible range of diaphragm values.

In addition, the needles may be of different shape to provide still another means of distinguishing between them.

The invention will be described in greater detail in connection with the drawings in which:

FIG. 1 is a perspective drawing of a camera with sections removed to reveal the interior mechanism of the shutter and the various controls and members making up the present invention;

FIG. 1a shows a gear train which is diagrammatically indicated in FIG. 1 and which controls the needle that indicates exposure conditions when the camera is set for photoflash operation;

FIGS. 2 and 3 show an indicating device for use in the camera of FIG. 1, the device being provided with a mask that hides the needle connected to the exposure meter when the camera is set for automatic photoflash operation and which hides the other needle when the camera is set for automatic daylight operation;

FIGS. 4 and 5 show an indicating device which is so arranged as to cause the needle not being used at any given time to disappear from the field of vision; and FIG. 6 is a top view of a section of the camera of FIG. 1 illustrating a mirror for reflecting an image of the indicating device into the viewfinder.

Referring to the drawings, it will be seen that the camera includes a housing, or case, 1 within which is a photocell 2 that forms the photosensitive element for an exposure meter 3. The exposure meter has a needle 3a that cooperates with a sensing device 4–7. A diaphragm control 8 in the form of a ring rotatably mounted in or on the camera housing 1 governs the operation of the diaphragm mechanism of the main lens, which will be referred to hereinafter simply as the lens. On the outer surface of the control ring 8 is a stepped cam 8a with which a catch in the form of a two-armed lever 9 controlled by the sensing device 4–7 cooperates. The lever 9 has an extension 9a that extends parallel to the optical axis of the lens and to which a pin 10 is attached to cooperate with two cams 11a and 11b on the inner circumference of a control 11 that determines whether the camera is set for the functional range indicated as "Automatic Daylight" for taking pictures under automatic control of the exposure meter with available light or to the functional range indicated as "Automatic Photoflash" for taking pictures with the aid of photoflash equipment.

One member of the sensing device is a bell crank lever 6 pivotally mounted on a fixed pin 12 and provided with a pin 6a that engages a slot 13 on a sensing slide 5. The latter has a stepped cam edge 5a that is engaged by the needle 3a which is attached to a rotating coil. A clamping device may, as is already known, be added to retain the needle 3a in a fixed position during the sensing process so that it will not be shunted aside by the cam 5a. The bell crank lever 6 has a projection 6b which is arranged so that when the lever 6 is rotated counterclockwise by the spring 7, the projection 6b hooks over a control edge 8b on the control ring 8. The setting member 8 has an arm 8c which, when the shutter is cocked, abuts against a locking or arresting member 15 operatively connected to the shutter release.

In the position of the control ring 8 shown in FIG. 1 the diaphragm is set at the largest aperture. Another arm 8d, extending perpendicularly to the plane of the control ring 8, engages an arm 16a that extends from a diaphragm control member 16 in a direction parallel to the optical axis, the control member 16 being concentrically rotatably mounted with respect to the optical axis. The diaphragm aperture control member 16 is non-rotatably connected to a diaphragm actuating ring 17 by means of a pin 19 affixed to the ring 17 and engaging an opening, or a recess, 16b in the diaphragm setting member. A spring 20 attached at one end to a fixed pin 21 and at the other end to the arm 16a of the diaphragm setting member urges the latter, along with the actuating ring, to rotate counterclockwise which is in the direction toward the smallest diaphragm aperture.

In the cocked position of the shutter, as shown in FIG. 1, the sensing projection 6b rests against the apex of a cam 8b on the control ring 8. In this position, the sensing slide 5 is away from the needle 3a, so that the needle is free to move back and forth in response to current produced in the coil 14 by the photocell 2. After the shutter has been released to make a photograph and the control ring 8 has been set free, it starts to rotate counterclockwise, along with the setting member 16 and the actuating ring 17. This produces a relative sliding movement between the sensing projection 6b and the control cam edge 8b which causes the sensing slide 5 to be pulled upwardly by the spring 7, thus bringing the cam edge 5a into contact with the needle 3a so as to sense the position of the needle.

The levers 9 and 6 are resiliently pulled together by the spring 4 and as a result the lever 9 follows the motion of the sensing device, thus being set with respect to the stepped cam 8a at a position determined by the position of the slide 5. After the control ring 8 has been released, the cam 8a strikes the pointed end 9b of the lever 9, which brings the rotation of the ring 8 to a stop. However, during the rotation of the ring 8 the diaphragm lamellae 18 are being set to the right aperture size according to the light intensity measured by the exposure meter 3.

The camera comprises two controls 11 and 23 in the form of rings coaxial with the optical axis. The control 23 is a focusing control having a distance scale 26 on it and this control is set to bring a particular point on the scale 26 opposite a fixed mark 25.

The control 11 sets the camera for operation in the "Automatic Daylight" and "Automatic Photoflash" ranges for which purpose the control has a setting position indicated by the letter "A" and a guide number scale 27. The mark "A" indicates the setting for 'Automatic Daylight" operation in which the diaphragm aperture is controlled by the exposure meter 3 operating through the setting device 4–9. In the "Automatic Photoflash" range, the control 11 must be set so as to bring the proper point in the scale 27 into position according to the guide number of the photoflash bulb being used. The diaphragm lamellae 18 will then be automatically set in accordance with the guide number equation $L = B \times E$ by means of a device to be described hereinafter. Both the mark "A" and the various points on the scale 27 are set with reference to a fixed pointer 28.

The focusing control 23 has a cam 23a on its inner circumference, and one end of a lever 29, which is pivotally mounted on a pin 30, presses against this cam. The cam 23a is shaped so as to be able to compensate for the difference between the setting characteristics of the focusing control and of the diaphragm mechanism. The slope of the cam 23a extends in the direction toward the closest point to which the lens may be focused as indicated on the scale 27 so that the lever 29 rotates counterclockwise as the camera is focused closer and closer. A catch lever 31 coperates with a stepped cam 16c on the diaphragm setting member. This lever has an arm 31a that engages the free end of the lever 29 and is held against it by the force of a spring 32 wound around a shaft 33 on which the lever 31 is rigidly attached. The spring 32 is compressed between the arm 31a and a fixed member 22.

When the focus control 23 is set for smaller distance values, both the lever 29 and the catch lever 31 pivot counterclockwise about the shafts 30 and 33 causing the catch 31b to move away from the stepped cam 16c of the diaphragm setting member. This, in turn, causes the diaphragm setting member 16, after the shutter release has been actuated, to be rotated through a relatively larger angle by the spring 20 before the members 31b and 16c strike each other. Corresponding to the small distance value set, the diaphragm lamellae 18 are thereby moved from their starting position illustrated in FIG. 1 to a comparatively small aperture value.

The catch lever 31 is in the form of an angled lever with an upwardly extending arm terminating in a sensing member 31c that serves as a cam follower for the cam sections 11c, 11b and 11e of the guide number control 11. In FIG. 1 the guide number control is set at the "Automatic Photoflash" range, which places the sensing member 31c in proximity to the cam section 11c. If the control 11 is moved to bring the "Automatic Daylight" range, identified by the mark "A" into position opposite the pointer 28, the sensing member 31c will move to the cam section 11e by way of the ramp 11d. This causes the lever 31 to be pivoted against the force of the spring 32 into a position where the catch 31b is outside of the path of motion of the stepped cam 16c.

The indicating range between the controls 11 and 23 and the diaphragm setting member 16, also includes a lever 34 mounted for rotation on the shaft 33 and having a free end 34a that engages the cam section 11f on the control 11. The cam 11f is shaped so that when the control 11 is moved in the direction of higher guide number values, the lever 34 is pivoted clockwise about the shaft 33. This pivoting motion is not transmitted directly to the diaphragm setting member 16, but is transmitted by way of the lever 29 operatively connected to the catch lever 31. For this purpose the pin 30 on which the lever 29 is mounted, is affixed to the lever 34 so that clockwise rotary movement of the lever 34 when the control 11 is set for a higher guide number causes the entire lever 29 to move and thus to move the lever 31 in a counterclockwise direction. This movement of the lever 31 rotates the catch 31b away from the path of motion of the stepped cam 16c, which permits the diaphragm setting member 16 to rotate through a larger arc under the force of the spring 20 and thus to set the diaphragm at a smaller aperture size before one of the radially outward steps of the cam 16c strikes the catch 31d.

In FIG. 1 it may be seen that the needle 35 is operatively conected to the shaft 33 on which the catch lever 31 is mounted. This needle is part of an indicating device which informs the photographer, when the camera is set to the "Automatic Photoflash" range, whether the diaphragm value determined by the guide number equation $L = B \times E$ and to be expected in accordance with the number setting of the guide number of the flash bulb being used and the distance to which the camera is focused, is within the diaphragm setting range of the camera in use. For this purpose the needle 35 cooperates with an indicating field 37a which is mounted on a fixed carriage 36 and is adjusted to the setting range of the diaphragm. This field may be provided with a numerical diaphragm scale if desired. In order to provide a particularly striking warning, the ends 37b the field 37a may be colored, or may be colored differently than the central portion of the field. For example, the central portion 37a may be green and the ends 37b may be red to indicate to the photographer that a diaphragm value to which the camera in use cannot be set is indicated in accordance with the guide number equation and the setting of the controls 11 and 23. For example, if the diaphragm is capable of being set to any value between "2.8" and "22" but the guide number equation indicates that an aperture larger than "2.8" or smaller than "22" is required, the needle 35 will point to one of the red areas 37b at the appropriate end of the field 37a. In this case, either a different flash bulb having a different and more appropriate guide number must be substituted or the distance to which the lens is focused must be changed so as to return the needle to the region of the indicating field 37a.

As is shown particularly in FIG. 1a, the needle 35 is connected to the shaft 33 by a gear chain that comprises a segment gear 38 rigidly attached to the shaft 33, a pinion 38b that meshes with teeth 38a on the segment 38, a shaft 38c to which the pinion 38b is attached, another segment gear 38d attached to the other end of the shaft 38c, a second pinion 38e meshed with segment 38d and a shaft 38f to which the pinion 38e and the needle 35 are attached. The axis of the shaft 38f is in a plane perpendicular to the optical axis of the objective lens.

Another needle 39 cooperates with the indicating field 37a and the warning areas 37b. The needle 39 is rigidly connected to the rotating coil 14 of the exposure meter 3. The purpose of this needle is to indicate, when carrying out exposures with the camera set to the "Automatic Daylight" range, whether the ambient light is sufficient in view of the film sensitivity and the selected exposure time, to permit a properly exposed photograph to be made with the diaphragm set at some point within its range of values. The two needles 35 and 39 may be mounted coaxially with respect to each other so that their outermost ends 35a and 39a, which are adjacent to the indicating field 37a and the warning areas 37b, are visible at the top and the bottom edge, respectively, of the indicating scale. In order to help distinguish the needle ends 35a and 39a from each other, they may be of different shapes. For example, the end 35a may be point-shaped while the end 39a may be triangular.

In order to read the indicating device, which is built into the camera housing 1 along with the exposure meter 3, a window 40 may be placed in the front side of the housing, as is shown particularly in FIG. 6. A mirror 41 is placed within the housing behind the window 40 to reflect light entering the window 40 along a path that will pass through the indicating field 37a and 37b supported on the carrier 36. Preferably the carrier is made of a transparent material. After passing through the carrier 36, the light strikes a prism 44, which is placed in the light path between the view finder elements 42 and 43. Thus the light reflected by the prism 44 appears in the view finder 42 and 43 as a luminous frame 45, in addition to the indicating field 37a and the warning areas 37b. Furthermore, one of the needle points 35a or 39a, also appears in the view finder.

In order to prevent any mistakes in reading the indicating device, and in order to indicate to the photographer whether the camera is set in "Automatic Daylight" or "Automatic Photoflash" range, means are provided which are operated by the control 11, to allow only one of the needle points 35a or 39a to be visible at any time. In the embodiment shown in FIGS. 2 and 3, such means include a mask 46, having a window 46a the height of which corresponds approximately to the height of the indicating field 37a and the warning areas 37b. The mask 46 is shown in the form of a slide which permits it to be set easily by sliding it in a direction perpendicular to the optical axis so that the window 46a uncovers either the needle point 35a or 39a, one of which is immediately below the indicating field 37a and the other of which is immediately above it. The mask 46 slides freely within a guide 1a in the camera housing. In order to control the slide 46 it is provided with a pin 47, and one end of a spring 49 is attached to this pin while the other end of the spring is attached to a fixed pin 48 to exert the downward pressure on the slide 46 so as to urge the lowermost end of the slide 46 into contact with a fixed pin 50 when the guide number control 11 is set in the "Automatic Photoflash" range. In this case, the indicating field 37a is to operate in conjunction with the needle point 35a, as may be seen in FIG. 2. In order for the control 11 to move the slide 46 upwardly, an extension 46b on the slide extends into the path of motion of a driving pin 51 on the control 11. The arrangement is such that the driving pin 51, as indicated in FIG. 3, pushes up the extension 46b and moves the mask 46 against the pressure of the spring 49 so that the mask covers the needle point 35a and, at the same time, exposes the needle point 39a. As may be seen in FIG. 3 the mark "A" is placed opposite the pointer 28 to indicate that the camera is set for "Automatic Daylight" exposure.

FIGS. 4 and 5 show another embodiment in which, instead of a mask 46, the needles 35 and 39 are alternatively pivoted so that only one of the needle points 35a or 39a is in the field of vision adjacent to the indicating field 37a at any time. This may be accomplished by a switch comprising contact arms 52 and 53 in series with the circuit of the exposure meter 3. The switch is so arranged as to open when the control 11 is set in the "Automatic Photoflash" range. Because of this open circuit, the needle 39 moves to the end of its range of travel under the action of a restoring spring attached to the exposure meter 3. On the other hand, when the control 11 is moved so as to place the camera in its "Automatic Daylight" range, as shown in FIG. 5, the switch arms 52 and 53 are held closed by the pin 54. This restores the series circuit and causes the needle point 39a to move into position adjacent to the indicating field 37a or the warning areas 37b thereof, as may be determined by the light reaching the photocell 2. At the same time the other needle 35 is moved out of proximity with the indicating field 37a. This is accomplished by the catch lever 31, which cooperates with the diaphragm setting member 16 and is moved in response to the setting of the control 11 to its "Automatic Daylight" range. When the control 11 is so moved, the cam sections 11d and 11e engage the sensing member 31c to pivot the catch 31b outside of the path of motion of the stepped cam 16c. Because of the connection between the catch lever 31 and the needle 35, this movement of the catch lever 31 causes the needle 35 to be moved aside so that it is no longer visible in the view finder 42 and 43.

The above described camera operates as follows: If the camera is to be operated in the "Automatic Daylight" range, the mark "A" on the control 11 must be placed opposite the pointer 28. If the photographer then looks through the view finder 42 and 43 in order to focus the camera on the scene to be photographed, he will observe the needle point 39a. If this needle point is adjacent to the green indicating field 37a, the photographer will know that the light conditions are proper for making a satisfactory exposure. If, on the other hand, the needle 39a is adjacent to one of the red warning areas 37b, it will be an indication that the light is either too intense or too weak for making a satisfactory photograph. It is necessary to move the sensing diaphragm setting device into the starting position illustrated in FIG. 1 by cocking the camera shutter, which causes the diaphragm lamellae 18 to be set at the largest aperture size.

Simultaneously, with the actuation of the shutter release, the sensing device, which has been retained in the starting position by the control edge 8b of the control ring 8, becomes operative. The spring 7 pulls the sensing slide 5 upwardly until it engages the needle 3a. This sets the catch lever 9 with respect to the stepped cam 8a. At about the same time, the control ring 8 begins to rotate along with the setting members 16 and 17 for the diaphragm lamellae 18. These setting members are connected to the ring 8 and rotate counter-clockwise under the force of the spring 20, causing the lamellae 18 to close to a smaller aperture, the exact size of which will be determined by the point at which the end 9b of the catch lever 9 engages one of the steps of the cam 8a. This entire operation is completed before the shutter is actually released to expose the film.

If photoflash pictures are to be taken, the control 11 is rotated until the guide number of the flash bulb being used is brought opposite the fixed pointer 28. In the embodiment shown in FIGS. 2 and 3, this rotary motion causes the driving pin 51 to move the mask 46 downwardly onto the fixed pin 50 by means of the force of the spring 49. This causes the mask 46 to cover the needle point 39a and simultaneously to uncover the needle point 35a. If the needle point 35a is in the region of the indicating field 37a, a properly exposed photograph can be taken. On the other hand, if the needle point 35a is in one of the red warning areas 37b, it is an indication that a properly exposed photograph could be made only by setting the diaphragm to an aperture which is either larger or smaller than the range of values permitted by the particular diaphragm in the camera being used.

Setting this control 11 to the "Automatic Photoflash" range also causes the pin 10 on the arm 9a of the catch lever 9 to move from the cam section 11b to the cam section 11a. This in turn causes the catch lever 9 to be moved into the end position illustrated in FIG. 1 which is outside of the path of motion of the step cam 8a. At the same time the catch lever 31 operating with the diaphragm setting member 16 is controlled by the cam section 11c which sets the linkage 29 to 34 so that the diaphragm will be controlled properly for taking photoflash exposures.

In the embodiment shown in FIGS. 4 and 5, the switch arms 52 and 53 in the circuit of the exposure meter 3 are opened when the control 11 is set to its "Automatic Photoflash" range. This causes the needle 39 connected to the exposure meter to move to an end position, as illustrated in FIG. 4, outside of the field of vision of the view finder 42 and 43. At the same time the needle 35 is moved into some position where it can be seen in juxtaposition to the indicating field 37a or one of the warning areas 37b. The position reached by the needle 35 corresponds to the guide number that has been set by the control 11 and the distance to which the focusing control 23 has been set. The setting of the needle 35 is carried out by the linkage 29 to 34 which is designed to set the diaphragm when making photoflash pictures.

What is claimed is:

1. A photographic camera comprising: a variable diaphragm; a diaphragm setting member connected to control said diaphragm; a differential mechanism connected to control said diaphragm setting member said differential mechanism having a rotatable output shaft operably connected to said diaphragm setting member in the flash range of said camera; a distance control connected to said differential mechanism to exert partial control thereof; a guide number setting control connected to said differential mechanism to exert partial control thereof; an indicating device comprising a field having a diaphragm aperture scale thereon and a needle to indicate selected portions of said field; and a connection from said shaft to said needle to control the latter to indicate on said field the diaphragm setting determined by the combined settings of both of said controls.

2. A photographic camera comprising: a variable diaphragm; a diaphragm setting member connected to control said diaphragm; a differential mechanism connected to control said diaphragm setting member said differential mechanism having a rotatable output shaft operably connected to said diaphragm setting member in the flash range of said camera; a distance control connected to said differential mechanism to exert partial control thereof; a guide number setting control connected to said differential mechanism to exert partial control thereof; an indicating device comprising a field having a scale thereon and warning areas at each end thereof and a needle to indicate selected portions of said field; and a connection from said shaft to said needle to control the latter to indicate on said field the diaphragm setting determined by the combined settings of both of said controls.

3. A photographic camera comprising: a variable diaphragm; a diaphram setting member connected to control said diaphragm; a differential mechanism connected to control said diaphragm setting member said differential mechanism having a rotatable output shaft operably connected to said diaphragm setting member in the flash range of said camera; a distance control connected to said differential mechanism to exert partial control thereof; a guide number setting control connected to said differential mechanism to exert partial control thereof; an indicating device comprising a field and means to indicate selected portions of said field; and a connection from said shaft to said indicating device to control the latter to indicate the diaphragm setting determined by the combined settings of both of said controls.

4. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; a differential mechanism comprising a rotatable output shaft operably connected to said diaphragm setting member in the flash range of said camera, said differential mechanism being associated with means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said controls; an indicating device comprising a field and a needle connected to said shaft to indicate the aperture size of said diaphragm as controlled by the settings of said controls; and means comprising a second needle connected to said exposure meter to indicate the aperture size of said diaphragm as controlled by said automatic means.

5. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; a differential mechanism comprising a rotatable output shaft operably connected to said diaphragm setting member in the flash range of said camera, said differential mechanism being associated with means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said controls; an indicating device comprising a field and a needle connected to said shaft to indicate the aperture size of said diaphragm as controlled by the settings of said controls; and means comprising said field and a second needle connected to said exposure meter to indicate on said field the aperture size of said diaphragm as controlled by said automatic means.

6. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide member setting control; second means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said controls; an indicating device comprising a field and a needle connected to said controls to indicate the aperture size of said diaphragm as controlled by the settings of said controls; means comprising said field and a second needle connected to said exposure meter to indicate on said field the aperture size of said diaphragm as controlled by said automatic means; and means connected to and controlled by said second means to allow only one of said needles to be visible at any time during operation of said camera.

7. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; second means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said controls; an indicating device comprising a field and a needle connected to said controls to indicate the aperture size of said diaphragm as controlled by the settings of said controls; means comprising said field and a second needle connected to said exposure meter to indicate on said field the aperture size of said diaphragm as controlled by said automatic means; and a mask conected to said second means to cover said needles alternately to permit only one of said needles at a time to be visible during operation of said camera.

8. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; second means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said controls; an indicating device comprising a field and a needle connected to said controls to indicate the aperture size of said diaphragm as controlled by the settings of said controls; a control edge operably connected to said second means and to said needle to move said needle out of sight when said diaphragm setting means is connected to said automatic means; means comprising said field and a second needle connected to said exposure meter to indicate on said field the aperture size of said diaphragm as controlled by said automatic means; and a switch connected to said exposure meter to be actuated so that said second needle moves out of sight when said diaphragm setting means is connected to said distance control and said guide member setting control.

9. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; a differential mechanism comprising a rotatable output shaft operably connected to said diaphragm setting member in the flash range of said camera, said differential mechanism being associated with means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the setings of said shaft; an indicating device comprising a field and a needle connected to said controls to indicate the aperture size of said diaphragm as controlled by the settings of said controls; means comprising said field and a second needle connected to said exposure meter to indicate on said field the aperture size of said diaphragm as controlled by said automatic means; a view finder; and a reflective device to reflect an image of said scale in said view finder.

10. A photographic camera comprising: a variable diaphragm; a diaphragm setting member connected to said diaphragm to control the aperture size thereof; an exposure meter comprising a photocell; automatic means connected to said exposure meter to be controlled thereby; a distance control; a guide number setting control; a differential mechanism comprising a rotatable output shaft operably connected to said diaphragm setting member in the flash range of said camera, said differential mechanism being associated with means for connecting said diaphragm setting means alternately to said automatic means for automatically controlling the aperture size of said diaphragm in accordance with light striking said photocell or to said distance control and said guide number setting control for automatically controlling the aperture size of said diaphragm in accordance with the settings of said shaft; an indicating device comprising a field and a needle connected to said controls and having a point adjacent to said field to indicate the aperture size of said diaphragm as controlled by the settings of said controls; and means comprising said field and a second needle connected to said exposure meter and having a point adjacent to said field to indicate on said field the aperture size of said diaphragm as controlled by said automatic means, said points of said needles having different shapes with respect to each other.

References Cited
UNITED STATES PATENTS

| | | | |
|---|---|---|---|
| 3,076,294 | 2/1963 | Swarofsky et al. | 95—10 |
| 3,076,397 | 2/1963 | Briskin et al. | 95—10 |
| 3,212,418 | 10/1965 | Kuppenbender et al. | 95—10 |

NORTON ANSHER, *Primary Examiner.*

J. F. PETERS, *Assistant Examiner.*